Oct. 26, 1937. F. J. KENNEDY 2,097,374
NIPPLE ATTACHMENT
Filed Jan. 9, 1936
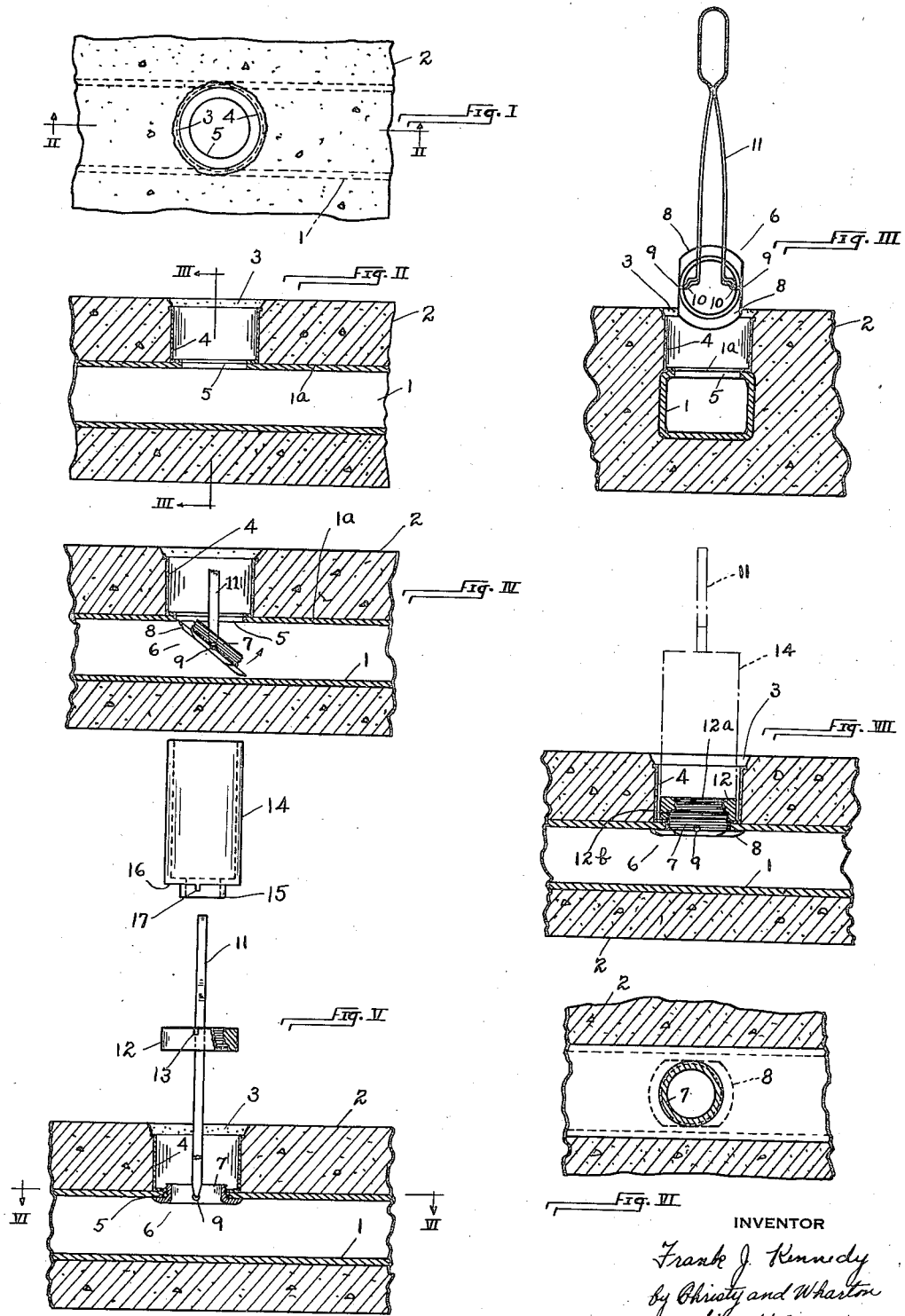
INVENTOR
Frank J. Kennedy
by Christy and Wharton
his attorneys Patented Oct. 26, 1937

2,097,374

UNITED STATES PATENT OFFICE 2,097,374

NIPPLE ATTACHMENT

Frank J. Kennedy, Brooklyn, N. Y., assignor to National Electric Products Corporation, a corporation of Delaware Application January 9, 1936, Serial No. 58,341

4 Claims. (Cl. 247—28)

This invention relates to a nipple attachment.

The invention resides in the attachment of a nipple in an opening through the upper wall of a conduit for electrical conductors.

When an underfloor duct comprises a single-piece conduit and a plurality of access elements attached to the upper wall of the conduit, the access elements block off spaces in the overlying body of floor material, which spaces are rendered available as access passages to the conduit, either by removing the access elements, or by displacing a removable cover on the access element, together with a skin of floor material lying thereover. When a section is drilled, or otherwise removed, from the upper wall of the conduit, through the passage thus provided, the interior of the conduit is made accessible from the surface of the floor.

The procedure of drilling through the conduit wall is more desirable than a procedure in which the conduit is provided with prepared openings having material of the conduit wall forming collars therearound. When, however, access is obtained to the interior of an embedded conduit of this nature, by drilling a simple opening through the upper wall of the conduit, it is a difficult matter to position in the opening through the conduit wall nipples for the reception of fittings into which portions of the conductors lying in the conduit may be drawn.

With this problem in mind, I have evolved a procedure employing a nipple assembly of specialized form, and cooperating tools of specialized form for positioning a nipple for engagement in the opening through the upper wall of a conduit, and for securing the nipple so positioned to the conduit at the wall opening therein.

In the accompanying drawing Fig. I is a fragmentary, plan view of a floor area, showing a conductor containing conduit embedded in the floor material, with an access passage leading to the upper wall of the conduit, and with an opening drilled through the upper wall of conduit at the base of the access passage through the floor material.

Fig. II is a vertical, sectional view through the floor material and underfloor duct shown in Fig. I, the view being taken on the plane II—II of Fig. I, longitudinally of the conduit.

Fig. III is a cross-sectional view, through the underfloor duct, on the plane III—III of Fig. II, showing the floor material also in section, and illustrating the insertion of a nipple of my specialized form through a passage in the floor material leading to an opening in the duct wall.

Fig. IV is a view in vertical section, taken longitudinally of the conduit, and showing the nipple inserted through the opening in the conduit wall into the interior of the conduit.

Fig. V is a view, taken in vertical section longitudinally of the conduit, showing the nipple, which has been introduced into the conduit, positioned in the opening in the conduit wall, being held therein by the tool of specialized form utilized for its insertion; this view also showing a sleeve for engaging and mounting the nipple in a position embracing the nipple-inserting and -supporting tool, during its passage to a position of contact with the nipple, the view also showing a specialized form of wrench adapted to embrace the nipple-supporting tool, and to engage the sleeve for screwing the sleeve to the nipple.

Fig. VI is a sectional view, taken on the horizontal plane VI—VI of Fig. V, illustrating particularly the position of the nipple with respect to the opening in the conduit wall, as the nipple is supported at the opening.

Fig. VII is a vertical, sectional view, taken longitudinally of the conduit, showing the nipple portion at the opening in the conduit wall, and mounted therein by means of the sleeve threaded thereto, the specialized tool for supporting and inserting the nipple, and the wrench for screwing the sleeve to the nipple being shown in broken lines.

In the drawings, reference numeral 1 designates a conduit of the one-piece type, shown as embedded in a floor 2 of concrete, or generally similar suitable material. The outer surface of the upper conduit wall 1a is shown as restrictedly accessible by way of a passage 3, which has therein a liner 4, such as the light-gauge cylindrical portion of an access shell designed to remain in position in the concrete. At the base of passage 3 a circular opening 5, through the upper wall 1a of the conduit, is shown.

Having this assembly and condition, my invention, as explained generally above, lies in the mounting of a suitable nipple in the opening 5 through the upper wall of the conduit. The nipple, formed to be mounted at an opening through the upper wall of the conduit, is designated generally by reference numeral 6. This nipple, as shown, comprises a threaded collar 7, and a primarily circular flange 8 extended from the base of the collar. In diametrically opposed regions the flange 8 is truncated inwardly to planes approximating tangency with the periphery of the collar. As so formed, the nipple has a major axis identical with the initial diameter of the flange, and a minor axis provided by truncation of the nipple flange, and represented by the diameter of collar 7, together with any slight extension of the flange 8 therebeyond in the regions of truncation.

As thus formed, the nipple has a dimension defined by its minor axis for insertion through an opening in the wall of the conduit, and a dimension defined by the major axis of the nipple for contact with the inner surface of the conduit wall adjacent the opening therein. While it is a matter of manufacturing convenience to form the nipple with a primarily circular flange truncated in diametrically opposed regions, it should be understood that the nipple, considered as a whole, may, if desired, be made elliptical, or with some generally similar flange contour.

The collar 7 of the nipple is provided with a pair of diametrically opposed circular holes or interiorly positioned depressions 9, the collar diameter intersecting which lies perpendicular to the major axis of the nipple flange. These holes or depressions 9 provide engagement for swinging mounting of the nipple about an axis provided by laterally extended teats 10, of circular section, on spring tongs 11. The tongs are formed to provide a resiliently exerted force tending to separate the teats 10. With the tongs compressed to insert the laterally extended teats 10 thereon into the openings 9 of the nipple collar, the collar is engaged by the tongs upon the relief of compression thereon, swingingly to support the nipple about an axis defined by the positioning of the tong-engaging openings or depressions 9 of the nipple collar.

With the nipple engaged and supported in the manner described above, it readily may be introduced through the passage 3 leading to the upper conduit wall, and through the opening 5 in the conduit wall. In so doing, advantage is taken of the swinging support of the nipple to present it to the opening in such manner that the presented dimension of the nipple is that defined by its minor axis.

Referring to Fig. IV of the drawing, the nipple is shown inserted as a whole into the interior of the conduit 1, and still swingingly supported by the tool 11. When thus wholly inserted, retraction, and some manipulation, of the tongs 11 serves to bring the nipple into the position shown in Figs. V and VI of the drawing.

In the position shown in Figs. V and VI the the collar 7 of the nipple is projected upwardly through the opening 5 in the upper wall of the conduit, with the extended flange portions adjacent the major axis of the nipple underlying the upper wall of the conduit adjacent the opening therein. It will be noted that the opening 5 in the conduit wall has a diameter shorter than the major axis of the nipple 6, and shorter than the diameter of the passage 3 leading to the upper wall of the conduit. There thus remains in the passage 3 an annular region surrounding the threaded exterior of the nipple, providing space for the seating of a sleeve threaded to the nipple, and of a diameter greater than that of the opening 5 through the wall of the conduit.

Fig. V of the drawing illustrates a step in the application of such sleeve 12 to the nipple. As shown, the sleeve 12 is passed downwardly along the tongs 11, and through passage 3 into a position in which it contacts the projected portion of the nipple collar 7. Sleeve 12 being provided interiorly with threads matching the exterior threading of nipple collar 7, the sleeve may then be screwed on the collar to bear against the upper wall of the conduit surrounding the collar of the nipple, and to engage the nipple at the conduit opening by embracing edge regions of the conduit wall between the sleeve and the extended flange regions of the nipple. In order to screw sleeve 12 to the projected region of the nipple collar 7, the sleeve is shown as provided with one or more recesses 13, extended downwardly from its upper surface for the engagement of a turning tool. The turning tool desirably utilized is a specialized wrench comprising a tubular body 14, which may embrace, and be passed downwardly along, the tongs 11, and which is constricted terminally to provide a lower portion 15 capable of entering the collar bore, and a shoulder 16 adapted to rest against the upper face of the collar. Dependent from shoulder 16 are one or more lugs 17, which are adapted cooperatively to engage in the recess or recesses 13 formed in the upper face of the sleeve 12.

It will be noted that the cooperative formation of collar 12 and wrench 14 is such that a wrench may be used without withdrawal of the tongs 11, supporting the nipple in position for mounting, and that the wrench 14 is of such form that it is readily operable from above the floor level when inserted into the passage 3 to engage the sleeve 12. Also the cooperative form of wrench and sleeve is such that the engagement between the sleeve and wrench lies within the diameter of the sleeve, thus avoiding necessity for enlargement of the passage 3, which would exist if the engagement of the wrench were to be with projection of the sleeve lying beyond the sleeve diameter.

Referring particularly to Fig. VII of the drawing, the nipple is shown fully mounted at the opening in the conduit wall. In this position a threaded region 12a in the bore of the sleeve lies upwardly beyond the region of engagement between the sleeve and the nipple collar. This bore region 12a is desirably, as shown, of a lesser diameter than the lower region 12b of the sleeve bore which engages the collar 7 of the nipple, and provides threading independent of the nipple engagement for the mounting of a receptacle or other fitting.

With the nipple in fully mounted position, as shown in Fig. VII, wrench 14 is withdrawn by merely lifting it from engagement with the sleeve 12, there being thus no possibility of loosening the engagement between the nipple and sleeve by withdrawal of the wrench. Tongs 11 are withdrawn by so contracting them that the laterally extended teats 10 of the tongs are withdrawn from engagement in the holes or depressions 9 of the nipple collar, and the tongs also may then be simply lifted from the mounted assembly.

The illustration and description are of the mounting of a nipple in a hole through the upper wall of a conduit embedded in a position below the floor level. The same problems exist, however, in mounting a nipple at a simple opening in a conduit wall, regardless of the location of the conduit. My invention is, therefore, of general advantage in that it permits nipples to be attached to the wall of a one-piece conduit to replace an integral hub thereon, thus simplifying the manufacture of the conduit, and permitting the final preparation of the conduit to be made, if so desired, in the locality of its installation.

I claim as my invention:

1. For mounted insertion in the wall of a duct having a prepared opening therein an insert nipple comprising a collar and a flange of irregular extension from the collar having its greater extension in two regions on opposite sides of the collar to provide a major axis and a minor axis for the nipple, the nipple collar being relatively shallow and being arranged interiorly thereof for pivotal engagement about an axis perpendicular to the major axis of the nipple, the nipple parts being so dimensioned relatively to each other that when the nipple is engaged interiorly of its collar and swung into a position with the nipple flange approximately perpendicular to the duct wall a projection of the area parallel to the duct wall occupied by the nipple has no dimension as great as the major axis of the nipple; whereby with the nipple engaged and swung to present its flange approximately perpendicular to the duct wall the nipple as a whole may be inserted through an opening of the duct wall having its greatest dimension less than the major axis of the nipple and greater than the greatest dimension of the said projected area occupied by the nipple when so held.

2. For mounted insertion in the wall of a duct having a prepared opening therein an insert nipple comprising a collar having extension from the periphery thereof in approximately opposed regions to provide a major axis and a minor axis for the nipple, the nipple collar being relatively shallow and being arranged for pivotal engagement about an axis perpendicular to the major axis of the nipple, the nipple parts being so dimensioned relatively to each other that when the nipple is pivotally engaged and swung into a position with the major nipple axis approximately perpendicular to the duct wall a projection of the area parallel to the duct wall occupied by the nipple has no dimension as great as the major axis of the nipple; whereby with the nipple engaged and swung to present its major axis approximately perpendicular to the duct wall the nipple as a whole may be inserted through an opening of the duct wall having its greatest dimension less than the major axis of the nipple and greater than the greatest dimension of the said projected area occupied by the nipple when so held.

3. An insert nipple assembly for mounted insertion in the wall of a duct having a prepared opening therein comprising a threaded collar, and peripheral projections extended approximately oppositely from the collar beyond the normal diameter of the collar, the depth of the threaded collar and the relative depth of the peripheral extensions being such that the nipple may be inserted as a whole into a prepared opening in a wall of the duct by tilting it into a transverse position, the nipple being engageable in the duct opening by extending the collar portion through the said prepared opening from the inside of the duct into substantially vertical relation with the duct wall, and a threaded collar or nut adapted to engage the threaded nipple collar and adapted to bind the nipple to the duct wall by engaging the duct wall between the nut contacting the outer surface of the wall and the peripheral projections from the nipple collar contacting the interior surface of the duct wall.

4. An insert nipple assembly for mounted insertion in the wall of a duct having a prepared opening therein comprising a collar, and peripheral projections extended approximately oppositely from the collar beyond the normal diameter of the collar, the depth of the collar and the relative depth of the peripheral extensions being such that the nipple may be inserted as a whole into a prepared opening in a wall of the duct by tilting it into a transverse position, the nipple being engageable in the duct opening by extending the collar portion through the said prepared opening from the inside of the duct into substantially vertical relation with the duct wall, and keeper means adapted to engage the region of the nipple collar extended vertically from the inside of the duct and to bear against the outer surface of the duct to engage the duct wall between the said keeper means and the peripheral projections from the duct collar lying within the duct.

FRANK J. KENNEDY.